United States Patent
Taleyarkhan

(10) Patent No.: US 10,310,100 B2
(45) Date of Patent: Jun. 4, 2019

(54) RADIATION DETECTOR

(71) Applicant: Purdue Research Foundation, West Lafayette, IN (US)

(72) Inventor: Rusi P. Taleyarkhan, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 15/633,185

(22) Filed: Jun. 26, 2017

(65) Prior Publication Data

US 2018/0348379 A1 Dec. 6, 2018

Related U.S. Application Data

(63) Continuation of application No. 14/419,808, filed as application No. PCT/US2013/053667 on Aug. 5, 2013, now Pat. No. 9,689,995.

(60) Provisional application No. 61/679,775, filed on Aug. 5, 2012.

(51) Int. Cl.
| | | |
|---|---|---|
| *G01T 1/18* | (2006.01) | |
| *H01J 47/00* | (2006.01) | |
| *G01T 1/178* | (2006.01) | |
| *G01T 5/06* | (2006.01) | |

(52) U.S. Cl.
CPC ............ *G01T 1/18* (2013.01); *G01T 1/178* (2013.01); *G01T 5/06* (2013.01); *H01J 47/001* (2013.01)

(58) Field of Classification Search
CPC .................................. G01T 3/00; G01T 1/18
See application file for complete search history.

(56) References Cited

U.S. PATENT DOCUMENTS

| | | | | |
|---|---|---|---|---|
| 5,026,986 | A * | 6/1991 | Hurst | G01T 1/178 250/253 |
| 5,550,381 | A * | 8/1996 | Bolton | G01T 1/14 250/374 |
| 6,326,626 | B1 * | 12/2001 | Orr | G01T 1/185 250/370.01 |
| 9,689,995 | B2 * | 6/2017 | Taleyarkhan | H01J 47/001 |
| 2003/0074010 | A1 * | 4/2003 | Taleyarkhan | A61B 17/22004 606/128 |
| 2006/0269033 | A1 * | 11/2006 | Taleyarkhan | G01T 1/167 376/153 |
| 2009/0296871 | A1 * | 12/2009 | Taleyarkhan | G01T 1/167 376/153 |

(Continued)

*Primary Examiner* — Marcus H Taningco
(74) *Attorney, Agent, or Firm* — Purdue Research Foundation; Zhigang Rao

(57) ABSTRACT

Alpha particle detecting devices are disclosed that have a chamber that can hold a fluid in a tensioned metastable state. The chamber is tuned with a suitable fluid and tension such that alpha emitting materials such as radon and one or more of its decay products can be detected. The devices can be portable and can be placed in areas, such as rooms in dwellings or laboratories and used to measure radon in these areas, in situ and in real time. The disclosed detectors can detect radon at and below 4 pCi/L in air; also, at and below 4,000 pCi/L or 300 pCi/L in water. When the fluid is tensioned the presence of radon can be determined by the formation of bubbles which give off detectable signals including a shock wave, light-beam cutoff, or a light burst, any of which can be measured to derive information on radon and progeny radioactivity levels in air or water.

15 Claims, 12 Drawing Sheets

(56) References Cited

U.S. PATENT DOCUMENTS

2011/0174990 A1* 7/2011 Taleyarkhan ............. G01T 5/06
250/473.1

* cited by examiner

ATMFD

~20 CM

~6 CM

CTMFD

~10-15 CM

~1-5 CM

~5-10 CM

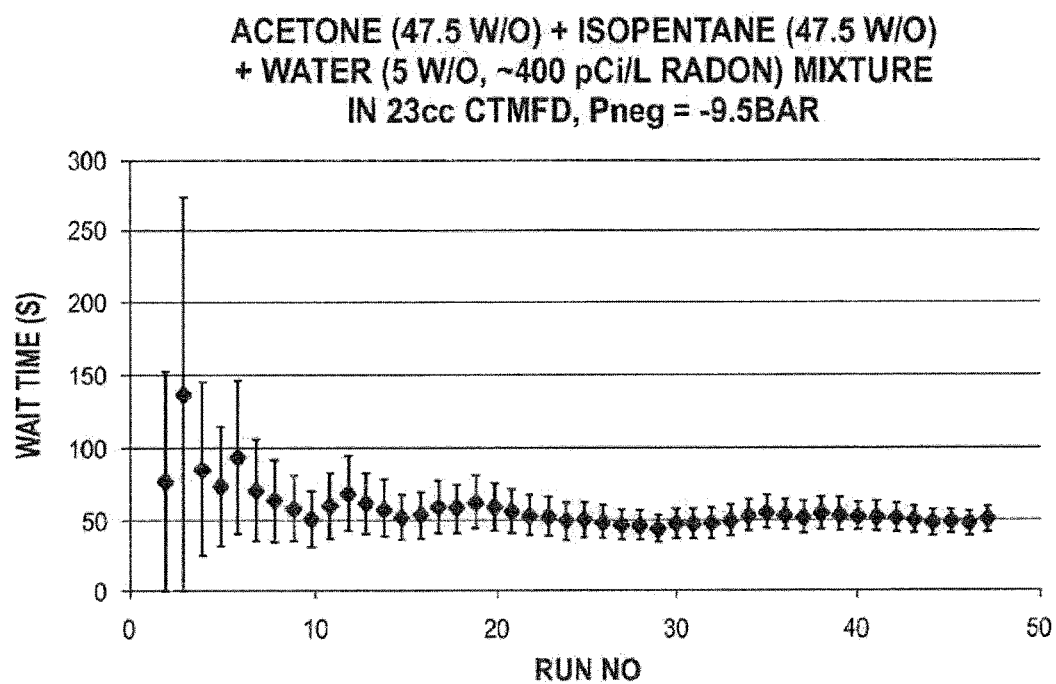

FIG. 12

SELF-CHARGING CTMFD DESIGN/OPERATION FOR AUTOMATED Rn IN AIR ACTIVITY SAMPLING, AND SUBSEQUENT DETECTION
STANDALONE, HANDS OFF USE IN HOMES, OFFICES,...

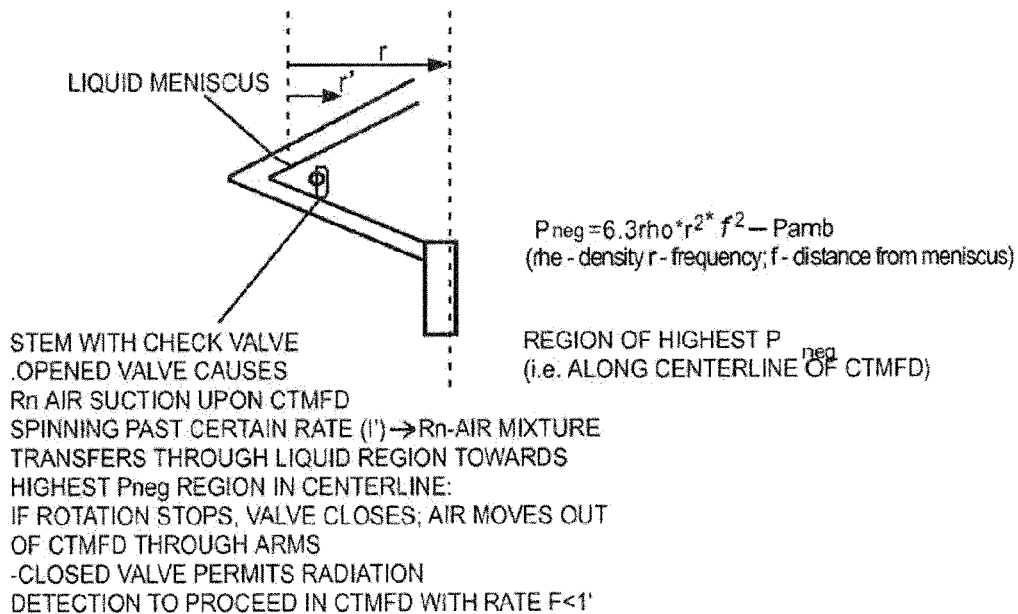

$P_{neg} = 6.3 rho \cdot r^{2*} f^2 - P_{amb}$
(rho - density; r - frequency; f - distance from meniscus)

REGION OF HIGHEST $P_{neg}$
(i.e. ALONG CENTERLINE OF CTMFD)

STEM WITH CHECK VALVE
.OPENED VALVE CAUSES
Rn AIR SUCTION UPON CTMFD
SPINNING PAST CERTAIN RATE (f') → Rn-AIR MIXTURE
TRANSFERS THROUGH LIQUID REGION TOWARDS
HIGHEST Pneg REGION IN CENTERLINE;
IF ROTATION STOPS, VALVE CLOSES; AIR MOVES OUT
OF CTMFD THROUGH ARMS
-CLOSED VALVE PERMITS RADIATION
DETECTION TO PROCEED IN CTMFD WITH RATE F<1'

RADIATION DETECTOR

The present application is a continuation of U.S. Ser. No. 14/419,808 (now U.S. Pat. No. 9,689,995, issued 27 Jun. 2017), which was a § 371 submission of international application no. PCT/US2013/053667, filed 5 Aug. 2013, which claimed the benefit of the filing date of U.S. Ser. No. 61/679,775, filed 5 Aug. 2012.

This invention was made with government support under DE-FG07-071D14890 awarded by the Department of Energy. The government has certain rights in the invention.

BACKGROUND

Radon poisoning arises from uranium (U) and thorium (Th), two of the most widely dispersed radioactive elements in the environment nationwide. For example, in the Navajo nation mining operations (1944-1989) covering four southwestern states, death rates from poisoning are found to be 3.3 times higher than the U.S. average. The uranium decay chain results in several daughter radionuclides such as $^{226}$Ra, $^{222}$Rn, $^{218}$Po, $^{214}$Po, $^{210}$Po, etc., all of which are in solid form except for radon (Rn), which is a heavy gas that can permeate the ground and enter into dwellings and get inhaled. FIG. 1 shows the $^{222}$Rn decay chain (Note: $^{220}$Rn from the Th decay chain is referred to as thoron; hereafter, we shall refer to Rn as meaning both, $^{222}$Rn and $^{220}$Rn). Some of the Rn daughter products decay by beta-gamma ray radiation. However, from a health perspective, it is the alpha radiation emitting radionuclides (e.g., $^{222}$Rn, $^{210}$Po, $^{220}$Rn) which cause the most severe health consequences due to their 100 to 1000-fold higher damage to cells. Rn poisoning via gas seeping through basements, from walls, or degassing from water during showering in U.S. homes results in over 21,000 deaths annually according to the Environmental Protection Agency (EPA). This is far greater than deaths from fires (about 3,000/y) or carbon monoxide poisoning (about 500/y).

Rn (an energetic alpha radiation emitter) is an odorless, colorless gas that kills silently most often in homes. Despite this, our society has become complacent with these deaths because reliable Rn monitoring systems are costly (about $10,000 to over $50,000). In addition their use requires time-consuming steps for Rn gathering in canisters over weeks to months which then must be assayed by trained specialists at off-site laboratories. Rn levels can fluctuate even daily due to which continual monitoring through the year is recommended. Even use of seemingly inexpensive ($50-$100) charcoal canisters for week-averaged localized monitoring can actually add up to $5,000 annually. This process is complicated by the fact that it is subject to tampering via intentional venting during lengthy sample collection by unscrupulous agents to skew results to avoid costly remediation and to provide false assurances to potential home buyers.

It is well known that the massive damage caused by an energetic alpha particle on to the DNA of cells amounts to a zero dose threshold for risk to humans. The chronic intake at even trace levels (in parts per million to billion and even quadrillion) can lead to detrimental health consequences and cancer deaths. Indeed, only about 4 pCi/L (about $4 \times 10^{-17}$ g/L) of radon in air constitutes the EPA action limit. A recent New York Times Op-Ed article (Field, 2012) highlights the issue even further as having been grossly underestimated and far more prevalent than thought in society. Radon is thought to be a threat for over 70,000 schools and colleges besides homes and buildings in the environment. Recently, the EPA proposed a rule for communities that mandate monitoring of radon in well water to ensure levels remain below 300 pCi/L as a maximum control level (MCL) when multimedia mitigation programs are in place. If multimedia mitigation programs are not in place, radon in water is monitored to ensure Rn levels are below 4,000 pCi/L as an alternate MCL.

Unlike mandates for smoke and now carbon monoxide detectors for all new homes, there are no regulations mandating in-situ Rn monitors in homes due mainly to affordability and complexity of such a regulation. A cost-effective, high efficiency, real-time sensor similar in scope to smoke or carbon-monoxide detectors could result in alerting dwellers to the presence of Rn above safe levels such that timely findings and remediation can take place.

Unfortunately, at present, people generally find that they have been exposed to lethal levels of Rn after the existence of Rn daughter products are discovered in a biopsy that has revealed terminal lung cancer. An improved, radon sensor technology is needed. Ideally, the sensor will be portable and quick (within tens of minutes) to use providing radon measurements in real time or close to real time.

SUMMARY OF THE INVENTION

Radon detecting devices are disclosed that have a chamber that can hold a fluid in a tensioned metastable state, such as an Acoustically Tensioned metastable Fluid Detector (ATMFD) or Centrifugally Tensioned Metastable Fluid Detector (CTMFD). The chamber is tuned with a suitable fluid (such as acetone, hexane, heptane, ethanol, methanol) and tension states (from −6 bar to −9 bar or lower) such that radon and one or more of its decay products can be detected. The devices can be portable and can be placed in areas, such as rooms in dwellings or laboratories and used to measure radon in these areas, in situ and in real time. The disclosed detectors can detect radon at levels below 4 pCi/L in air to below 4,000 pCi/L or 300 pCi/L in water. When the fluid is tensioned, the presence of radon can be determined by the formation of bubbles which implode to give off detectable signals including a shock wave, a light burst, or light-beam cutoff, any of which can be measured and recorded electronically.

Tension can be placed on the chamber fluid using an acoustic signal or by centrifugal force. Many fluids can be used in the device; however, acetone/hexane/ethanol/methanol and heptane are particularly well suited for use in the disclosed radon detectors due to their high affinity for radon. The level of radon retention/dissolution ability for the TMFD fluids increases with reduced temperature.

To operate the disclosed devices a potential radon contaminated material must be placed in contact with the detector fluid. This can be accomplished by bubbling radon contaminated air thru a fluid that can then be mixed with the fluid in the detection chamber.

DESCRIPTION OF FIGURES

FIG. 4A shows repeated rapid detection within about 12 to 15 seconds of Rn at activity levels that were not possible to monitor with a typical state-of-the-art liquid scintillation spectrometer (LS6500™ spectrometer from Beckman Coulter, Inc.).

FIG. 11 provides method and results indicating how one may directly detect Rn in water at EPA action levels with TMFD technology by mixing Rn-bearing water directly with TMFD fluids and detection for Rn activity in water without intermediate steps of Rn separation from water.

FIG. 12 provides method and design for hands-off operation of TMFD systems for Rn collection and detection to permit standalone Rn detection suitable for venues such as homes, offices and other locations bearing Rn in air

DETAILED DESCRIPTION OF INVENTION

Figure 1:
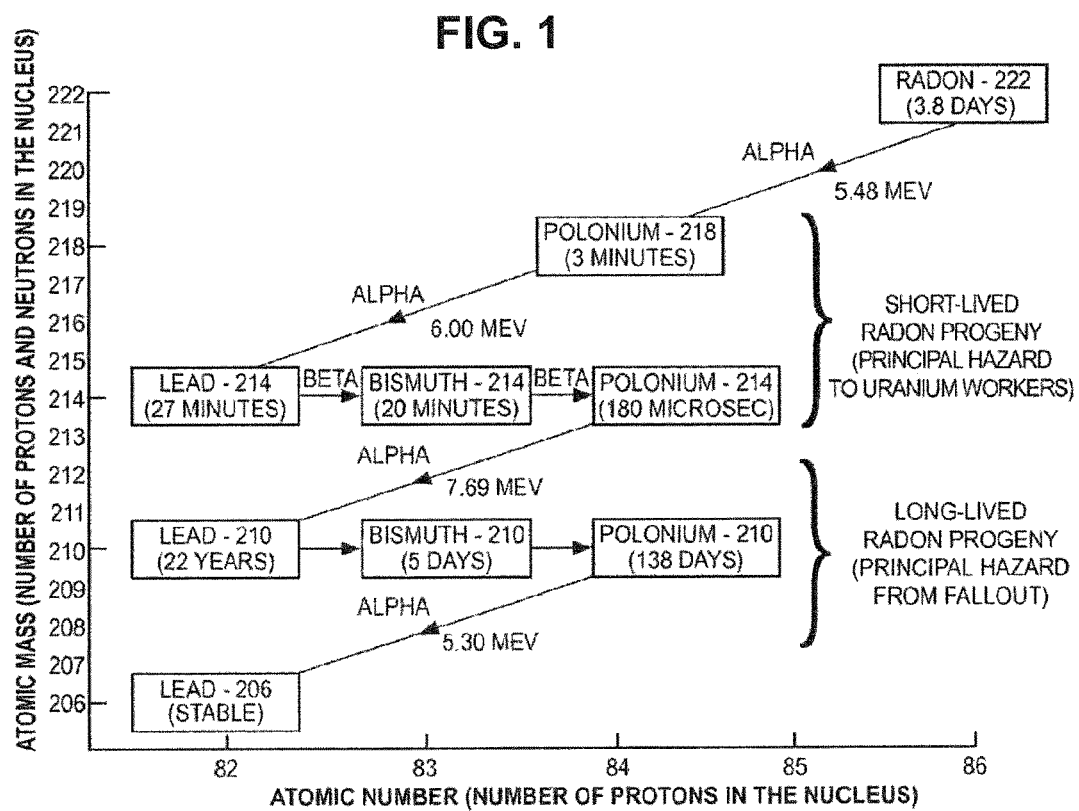
FIG. 1 shows the $^{222}$Rn decay chain (Note: $^{220}$Rn from the Th decay chain is referred to as thoron; hereafter, Rn is intended to meaning both $^{222}$Rn and $^{220}$Rn).

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Nomenclature and Terminology

| Acronym/Symbol | Description/Comment | Acronym/Symbol | Description/Comment |
|---|---|---|---|
| ATMFD | Acoustic Tensioned Metastable Fluid Detector | NIST | National Institute of Standards and Technology |
| CTMFD | Centrifugally Tensioned Metastable Fluid Detector | Po | Polonium |
| Bq | Becquerel (=1 disintegration per second) | Ra | Radium |
| Ci | Curie (about $3.7 \times 10^{10}$ Bq) | TMFD | Tensioned Metastable Fluid Detector |
| K | Potassium | U | Uranium |
| MeV | Million electronvolts (about $1.6 \times 10^{-13}$ J) | a | Alpha particle (monoenergetic positively charged nucleus of $^4$He) |
| Bi | Bismuth | b | Beta particle - negative electrons from nucleus) |
| Pb | Lead | g | Gamma ray (mono-energetic photon from the nucleus) |

In-situ monitors for Rn analogous to smoke and carbon monoxide detectors are disclosed that can be used to measure radon in virtual real-time and with improved sensitivity. For example, the detectors according to the present disclosure can detect radon at concentration levels at and below 4 pCi/L in air and at and below 4,000 pCi/l or 300 pCi/L in water. This sensitivity is well below the sensitivity of prior art detectors by several orders of magnitude. The disclosed detectors can be adapted for either active or passive detection, for constant Rn.

The monitors can rely upon tensioned metastable fluid detector (TMFD) sensors that have been adapted to measure radon.

Table 1 summarizes the innovative attributes of the disclosed radon monitors over currently known technologies. Air and water-borne radon can be rapidly accumulated measured using the TMFD-based detectors to detect, at a minimum, EPA defined radon limits. The detectors can be of three TMFD-adapted Rn monitoring system designs, including: (i) portable (for the homeowner or inspector); (ii) in-place (for unattended monitoring); and, (iii) laboratory-based (for enabling high precision spectroscopy, and fast-turnaround assays of large samples collected from the field).

TABLE 1

Comparison of key attributes of conventional and disclosed Rn monitoring systems

| Attribute | Conventional/Present Systems | Proposed TMFD-Rn Monitor |
|---|---|---|
| Time required to Monitor for EPA-action levels (about 4 pCi/L) | 5 to 90 or more days due to need for collection in traps; LS spectrometers may allow for direct Rn assay in water within hours but system costs are high- to the $50K+ range. | Seconds to minutes |
| Can a specific area of a room be assessed for Rn on demand? | No. Require multiple canisters to be spread over an area to collect on an averaged basis over days to months. | Yes |
| Detector efficiencies (typical) | Lucas Cells/LS (to 75%) - reliable use possible only after enough Rn is collected over 5 to 10 days or more for Lucas Cells; Ion Chambers (<<0.1%) - Highly unreliable and need weeks+ to offer order of magnitude Rn levels; Electret or Alpha track detectors (require week to months) | about 95-100% (every alpha-emission from Rn decay is counted with virtually no interference from gamma-beta background). |
| Susceptibility to Cheating/Tampering? | Yes. Susceptible to tampering during week-long collection. | No. Due to on-spot rapid monitoring capability. |
| False Positives from background radiation? | Yes. High (conventional detectors respond to radiation from Rn, but also to background from gamma-beta radiation); | Low to negligible; TMFDs are inherently blind to gamma/beta background radiation. |
| Total System Costs | $5K to $50K+ (Scintillator/electret/track based systems); even charcoal canisters add up to $3K-$5K/y at $50-$100/week; $150 (wall plug-in ion chambers take weeks to stabilize and are prohibited for sale in several US states; Note: Ion chamber technology works for "HIGH" radiation monitoring as around nuclear power reactors, not at trace (pCi) levels. | Targeted at less than $100 for homeowners, to about $1K for for real-time continuous/ reliable Rn monitoring and bulk laboratory-based spectroscopic assays. |
| Ease of Use | Although charcoal/track canisters are simple to place in homes, the actual assessment for Rn requires sending out to labs. with expertise in deployment of relatively sophisticated electronic-based counting systems for reliable results. | For average citizen use without specialized training; will allow for intermittent or continuous hands-off in-situ monitoring. |

Fluid-like solids can be stretched to tensile states. In at least one embodiment according to the present disclosure, the TMFD sensor technology is based on placing common fluids such as water or acetone in thermodynamic states of "tension" metastability under vacuum conditions (e.g., −5 bar) at room temperature. This is analogous to stretching a rubber band: the more the tension, the less energy is required to snap the bonds holding the material together. Once the bonds are stretched, excess energy deposited from the strike of a sub-atomic particle (e.g., a neutron or alpha particle with energies ranging from keV to MeV) with the molecules in a tensioned metastable fluid results in the nucleation of nanoscale bubbles which, surprisingly, grow to sizes visible to the naked eye. The bubbles then implode back to the liquid state accompanied. Bubble formation and decay creates detectable events, including audible shock signals and light flashes, which can be recorded using conventional electronics. The tensioned state and specific fluid properties can be tuned to measure the type and energy of the incident radiation and the energy deposition rate from radon. The disclosed detectors provide a visual and audible signal from which spectroscopic information can be obtained.

One surprising advantage of the disclosed detectors is that they can be configured to be substantially unaffected to gamma photons. This characteristic provides the advantage that the detectors can operate without background interference and hence can approach 100% efficiency.

Figure 2A:
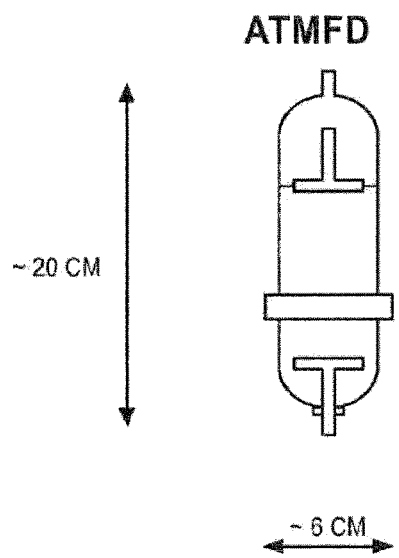
FIG. 2a shows a schematic diagram for an ATMFD.

FIG. 2 shows schematic diagrams for two types of TMFD systems that have been developed for use. The first system (FIG. 2a) uses piezoelectric elements to induce time-varying oscillating "acoustic" pressure fields (compression and tension) in a resonance mode at micro second time scales. This device is an ATMFD. When in the tension mode, the fluid field nucleates bubbles in transient fashion when nuclear particles provide the excess trigger energy. The location and timing of the visible and audible bubbles provides information on type and energy of the nuclear radiation, which can also be electronically recorded. In TMFD systems metastability in the fluid is induced via (a) oscillating pressure fields in the ATMFD and (b) centrifugal motion in the CTMFD device.

The acoustic tension metastable fluid detector (ATMFD) system (FIG. 2a), has a piezo-electrically driven enclosure designed to amplify mechanical oscillations when operating at a resonant mode, which permits amplification of small externally-induced power by several orders of magnitude. Oscillations of the piezoelectric element produce acoustic waves, which transmit energy into the liquid and create regions of fluctuating compression and tension pressure fields at high frequencies ranging from kHz to MHz. In the compression cycle, the ATMFD remains completely blind to all forms of radiation. However, in the tensioned (sub-zero pressure) part of the cycle, the ATMFD is selectively sensitive to neutrons, alpha recoils and fission products, as well as to photons. As such, the ATMFD turns on and off within microseconds.

Figure 2B:
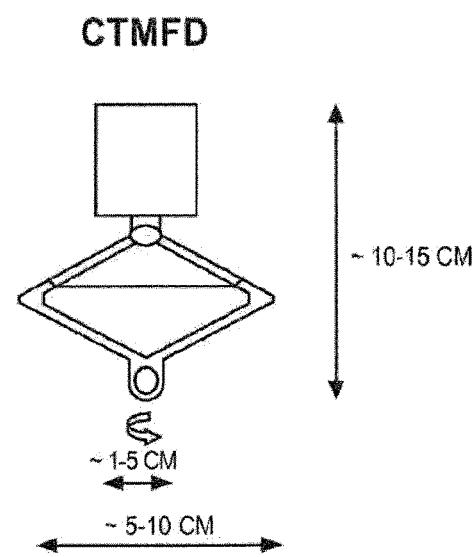
FIG. 2b shows a CTMFD and FIG. 2c shows sample shock signals arriving at 4 mounted microphones from a nuclear particle bubble cavitation shock signal induced detection event within the ATMFD.
Figure 4A:
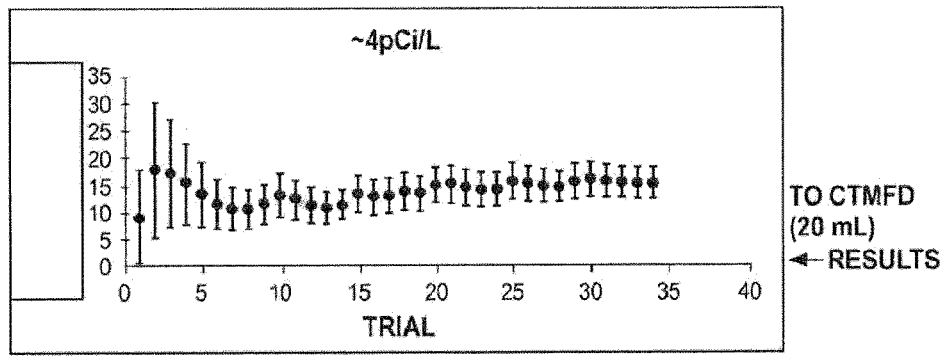
FIG. 4A provides a graphical illustration of the detection wait time versus trial run number.
Figure 4B:
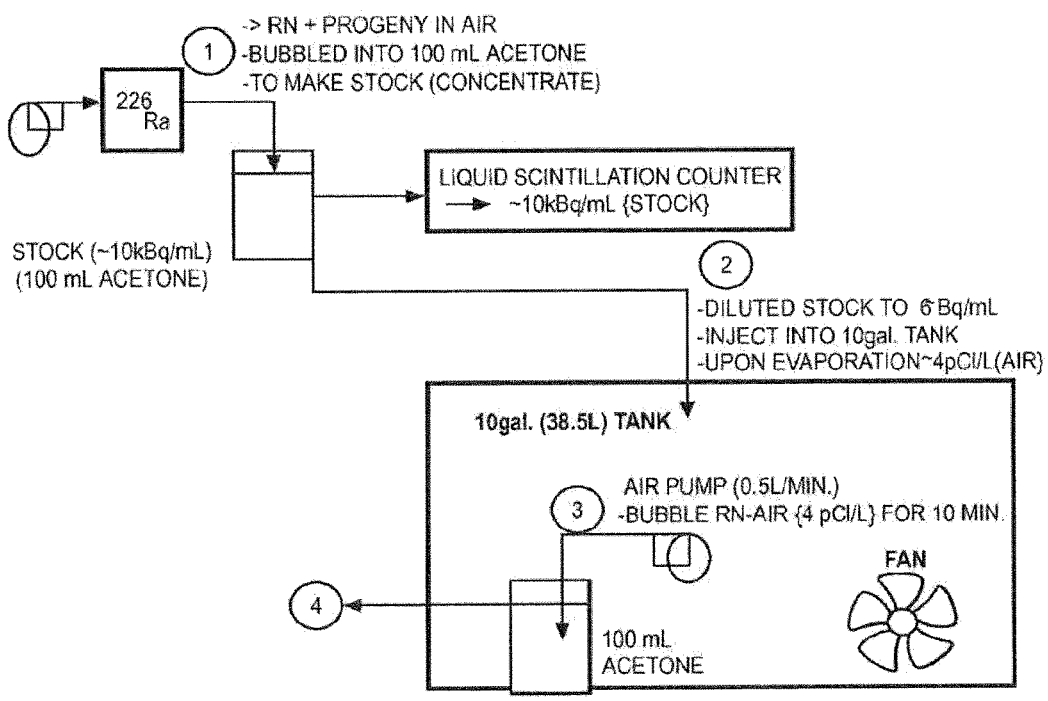
FIG. 4B illustrates a 4-step procedure used to demonstrate rapid entrapment of Rn and progeny by bubbling air from a pump using a flow rate of about 0.5 L/min for 10 minutes from within a controlled Rn-bearing air environment (of about 4 pCi/L constituting the EPA action limit for homes) into a 100 mL acetone volume followed by transfer of the acetone into a CTMFD apparatus with about a 20 mL sensitive detection volume, followed by imposition of centrifugal force to induce tension metastability level of about −9 bar.

The second TMFD system (FIG. 2b) creates tension via negative pressure induced in the central bulb via centrifugal force and is referred to as a CTMFD. An incoming nuclear particle triggers the formation within microseconds of a visible (about 10 mm), and audible bubble in the central bulb. The time it takes for the bubble formation upon reaching an appropriate level of tension pressure is indicative of a radioactive alpha radiation decay event, can be electronically recorded via light-beam cutoff which trips the drive motor to result in time to detect as shown in FIGS. 4 and 5. For example, if the radioactivity level is on average 0.1 Bq within the detector volume (i.e., 1/10 disintegration per second), on average it would take about 10 seconds between detection events. Therefore, by noting the average time it takes to detect signals, information on what the radioactivity level per unit volume can be determined. Two distinct detector types for inducing tension metastable states in fluids have been developed and are depicted in FIGS. 2a and 2b.

The CTMFD constitutes a simpler approach for Rn and progeny detection.

Tension metastable states in fluids are created using centrifugal force. This gives rise to their name centrifugal tension metastable fluid detector (CTMFD) system. A CTMFD system is illustrated in FIG. 2b which depicts an enclosure constructed from glass tubing formed into a diamond shaped apparatus. The apparatus is partially filled with a working liquid of density ρ and meniscus separation 2r attached to a variable speed motor. Upon rotation, centrifugal force pulls the molecules outward effectively placing the molecules in the central bulb region in a tensile state. The level of tension or negative pressure $p_{neg}$ on the centerline is given by $$p_{neg} = 2 \times \pi^2 \times \rho \times r^2 \times f^2 - p_{amb}$$

where, f is the rotational frequency and $p_{amb}$ is the ambient pressure. As a first order approximation, the pressure variation in the central bulb region can be modeled as flow between two cylinders rotating with the same velocity where the inner cylinder has a radius of zero. This approximation reduces to the well-known Bernoulli equation and it becomes apparent that for the small bulb radii used in CTMFD apparatus the pressure variation in the central bulb region is negligible. The pressure distribution varies quadratically with radius, quadratically with frequency of rotation and linearly with density of the liquid. For the system depicted in FIG. 2b, Pneg would equal the ambient pressure at radius=r (i.e., at the radius corresponding to the meniscus from the centerline separating the liquid from the air-void region above it in the upper arm). It would progressively (quadratically) decrease to the value "Pneg" at the centerline; i.e., exhibit the greatest tension within the central bulb region where detection events take place. Therefore, for a given density of TMFD fluid (about 1 g/cc for water; about 0.8 g/cc for acetone; about 0.65 g/cc for hexane; about 0.62 g/cc for isopentane), the desired levels of Pneg for conclusive Rn detection can be obtained by varying the frequency of rotation, f, for a given value of arm separation, "r". The table below provides example values of interplays between various parameters: via depiction of rotation speeds and resulting Pneg values for the two apparatus types with various liquids, one with central volume of about 3 cc where the "r" value typically is about 6 cm; or the other variety where the central bulb is about 20 cc where the "r" value typically is about 13 cc. As noted, for the larger system where the radius separation is about 13 cm versus about 6 cm for the smaller system, one can more readily attain the desired Pneg (tensioned metastable pressure) states with much reduced rotation frequencies.

| Fluid type | Density (g/cc) | Radius (cm) | Frequency (Hz) | Pneg (bar) |
|---|---|---|---|---|
| Water | 1 | 6 | 100 | 6.1 |
| Water | 1 | 6 | 150 | 14.9 |
| Acetone | 0.8 | 6 | 100 | 4.7 |
| Acetone | 0.8 | 6 | 150 | 11.8 |
| Hexane | 0.65 | 6 | 100 | 3.6 |
| Hexane | 0.65 | 6 | 150 | 9.4 |
| Water | 1 | 13 | 50 | 7.3 |
| Water | 1 | 13 | 65 | 13.1 |
| Acetone | 0.8 | 13 | 50 | 5.7 |
| Acetone | 0.8 | 13 | 65 | 10.3 |
| Hexane | 0.65 | 13 | 50 | 4.4 |
| Hexane | 0.65 | 13 | 65 | 8.2 |

The above parametric range is provided for illustrative purposes.

Both methods described above can be used for detecting a range of nuclear particles over a wide energy spectrum. For the CTMFD, we generally detect onset of radiation induced detection which forms a fast growing (within microseconds) bubble within the central bulb of the CTMFD shown in FIG. 2b. This is readily accomplished preferentially via light beam cutoff between transmitter-receiver pairs surrounding the central bulb; which accompanies the audible shock signal that also occurs during bubble formation and which may also be recorded using conventional microphones outside. In the case of devices utilized for data presented in this application, detection was accomplished via use of a combination of a light beam transmitter (e.g., 940 nm wavelength IR photodiode; 20 mA forward current; 15 mW/Sr radiant intensity; 10 degrees viewing angle; with an operating range between −10° C. to 85° C.) positioned one side of the central bulb of the CTMFD shown in FIG. 2b, and a phototransistor type light beam collector (e.g., multicompoft-5301 phototransistor; npn polarity; 860 nm wavelength, 75 mW power consumption; 2 pin; RoHS compliant) positioned diametrically opposite the transmitter. Both elements are located within about 1-2 cm of the CTMFD central bulb. The size of the transmitter-receiver elements and light beam diameter should preferentially be a fraction of the size of the sensitive TMFD volume (in this case, typically about 5 mm OD). Typically, about 4.5V voltage separation is present in the absence of a bubble, followed with a rapid (e.g., within nanoseconds) change in the voltage signal between transmitter and receiver of approximately 2V when a bubble event takes place in the CTMFD (where transparent fluids tested are acetone, methanol, R-113, hexane, isopentane, water, etc.).

Both disclosed systems can be scaled as desired.

Alpha particle monitoring requires that the alpha emitting radionuclides be placed within the TMFD since the penetrating power of alpha radiation is typically only in the few microns through materials like glass and acetone. The relative simplicity of design and function makes the CTMFD system ideal for detection of a variety of nuclear particles (especially dissolved alpha emitters) and for determining the tension thresholds of various working fluids, under a variety of environmental conditions.

For the data and evidence of functionality for Rn monitoring from air and water, the CTMFD apparatus type was used in tandem with sampling-collection-testing methods and protocols for rapidly and efficiently detecting radon (a gas) together with progeny over a wide range of concentration levels of practical interest ranging to levels in uranium mines (in the several tens to thousands of of pCi/L) through below 1 pCi/L range.

Figure 2C:
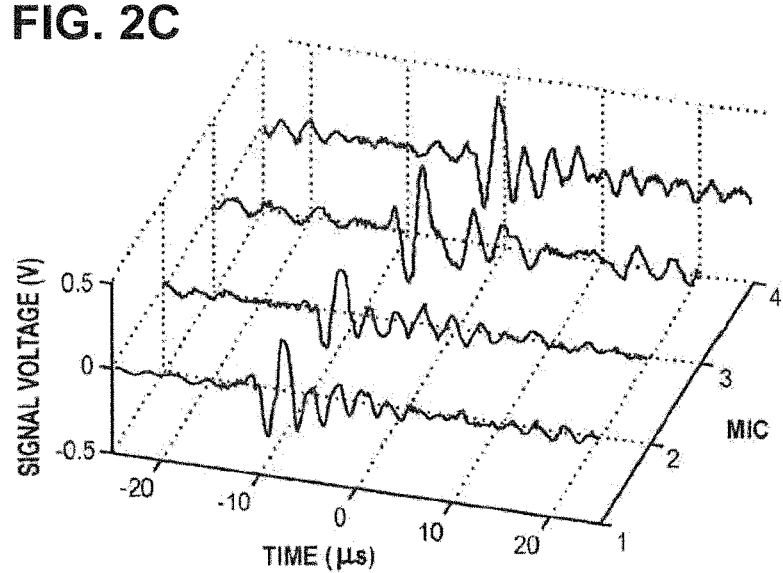

In the ATMFD detection is done by noting arrival of shock signals at tiny (e.g., about 2 mm OD) microphones made of piezoelectric type elements mounted to the outer walls of the chamber so that they can detect sound made by cavitation in the chamber fluid. Typical shapes of filtered microphone voltage signals arriving with a distinct time difference of arrival from the nucleated (detected) bubble to each of the four microphones is shown in FIG. 2c.

Figure 3:
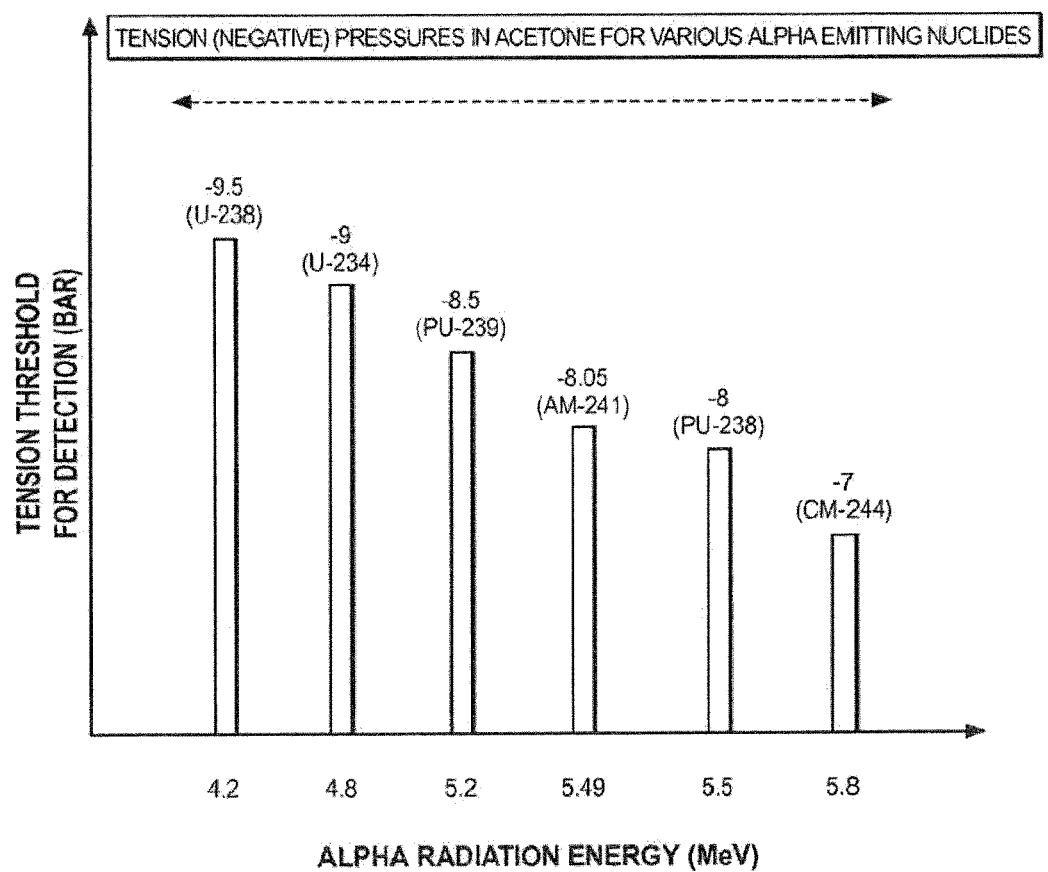
FIG. 3 illustrates results showing the TMFD detector's ability to discern in about 15 to 20 seconds, between trace (about 0.05 Bq/cc) alpha emitting isotopes.

The TMFD system can monitor trace (sub-pico curie) amounts via direct sampling in real-time time to provide spectroscopic information at levels of about 100-fold below the resolution of liquid scintillation spectrometry using LS6500™ type apparatus which cost several tens of thousands of dollars when newly purchased; they typically embody electronic background levels of about 1 Bq which limits the levels of activity they can reasonably be expected to detect with statistical significance A TMFD has been used to distinguish between $^{241}$Am and $^{238}$Pu alpha recoil emissions which are only about 2 keV apart. This is noteworthy, since the alpha radiation energy levels of $^{241}$Am and $^{238}$Pu are very close to each other, at about 5.5 MeV, indicating the possibility for differentiating the presence of individual isotopes, such as radon, with high fidelity. FIG. 3 illustrates the detector's ability to discern in about 15 to 20 seconds, between trace (about 0.05 Bq/cc) alpha emitting isotopes. Real-time and fission spectroscopy for Pu, U, Cm, and Am isotopes using a single TMFD system are shown. Such trace-level discernment was not possible when using a state-of-art Beckman™ liquid scintillation LS6500™ spectrometer. LS6500TM monitoring even at about 1 Bq/cc required hours of counting to attain statistically meaningful results. TMFDs conclusively monitor for alpha particles by tailoring the specific level of tension metastability. These data were obtained using NIST-certified radionuclides. As mentioned earlier, we have found that the 2 keV separation between actinide recoil energies of $^{238}$Pu and $^{241}$Am can, impressively, be done for trace-level isotopes virtually in real time (i.e., within 20-30 seconds).

The gamma blindness of the TMFD while ultra-sensitive to neutrons and alpha particles has been shown for external fields greater than about $10^{11}$ y/s which is far above the levels to be expected in radon-related situations. The disclosed radon detector can monitor selectively for alpha radiation in the Rn decay chain in which some isotopes (e.g., $^{210}$Pb, $^{210}$Bi) are strong beta (and gamma) emitters. Other beta-gamma radiation emitter elements are common in nature (e.g., $^{40}$K, $^{14}$C, $^{32}$P) such that samples of Rn-chain bearing specimens may include them, and this can result in a background limiting lower-level-discrimination (LLD). If one can be virtually totally blind (as TMFDs are) to such interference, the LLD can be lowered virtually to zero. This permits TMFDs to directly sample for Rn at much less than 1 Bq/cc without resorting to pre-concentration or counting for hours to days to derive statistically significant results. This distinguishes the disclosed detectors from liquid scintillation spectrometers and all other known devices where the background is at least about 1 Bq/cc.

The radon decay chain results in alpha radiation at various levels as shown in Table 2. The higher the alpha emission energy the less is the tension level required as shown graphically in FIG. 3 (which was developed when acetone is the TMFD sensor fluid). Different fluids require different levels of tension to detect specific alpha particles of distinct energies. To detect Rn and progeny with acetone, methanol or ethanol requires about −9 bar of tension pressure; to detect Rn and progeny with hexane requires at least about −8 bar of tension pressure; to detect Rn and progeny with heptane requires at least about −10 bar of tension pressure.

The background radiation (e.g., from cosmic radiation) gives rise to detection signals on average around once every 200 seconds. Therefore, sensitivity of detection from the about 0.1 Bq range (where detection times were about 12 to 15 seconds) as exemplified in Examples 1 and 2, could, theoretically be improved levels as low as about 0.005 Bq which is several orders of magnitude lower than from state-of-art spectrometers.

A device can be conveniently used for detecting radon by placing the radon detecting device in a space in which radon detection is needed such as a room and detecting whether radon is present.

As indicated, from inspection of Table 2, it can be appreciated that Rn from U and Th decay chains give rise to several alpha-emitting as well as beta-gamma emitting radionuclides. The energy levels of alpha emitters varies from about 5.48 MeV for $^{222}$Rn, to about 7.69 MeV for $^{214}$Po and to about 8.9 MeV for $^{212}$Po. A similar range presents itself for the Th decay chain. The beta-gamma energies also range from 0.57 MeV for $^{212}$Pb to about 3.77 MeV for $^{214}$Bi. These radionuclides could be airborne or water-borne or mixed with dirt that may include other beta-gamma emitting radionuclides (such as $^{14}$C, $^{40}$K, $^{32}$P). Since higher energy alpha emitters do not require as high a tension metastable state as lower energy alpha emitters (see FIG. 3) and because it is possible to detect $^{222}$Rn (5.48 MeV), all other radon derived alpha emitters of higher energy could also be detectable.

TABLE 2

Radon (& Thoron) Decay Chain Isotopes

| Isotope | Half-life | Decay Energy (MeV) (in increasing energy) | Main Decay Mode |
|---|---|---|---|
| $^{210}$Po | 138 days | 5.3 | Alpha |
| $^{222}$Rn | 3.8 days | 5.48 | Alpha |
| $^{218}$Po | 3 min. | 6.0 | Alpha |
| $^{212}$Bi | 61 min. | 6.2 | Alpha (35%)* |
| $^{216}$Po | 0.14 sec. | 6.9 | Alpha* |
| $^{220}$Rn (a.k.a., thoron) | 55 sec. | 7.53 | Alpha* |
| $^{214}$Po | 180 ms | 7.69 | Alpha |
| $^{212}$Po | 0.3 ms | 8.9 | Alpha* |
| $^{212}$Pb | 10.6 h | 0.57 | Beta* |
| $^{210}$Pb | 22 y | 1.02 | Beta |
| $^{212}$Bi | 61 min. | 2.2 | Beta (65%)* |
| $^{214}$Bi | 20 min. | 3.27 | Beta |
| $^{208}$Tl | 3.1 min. | 4.99 | Beta* |

*thoron decay chain.

TMFDs can directly detect in real-time the presence of Rn at the EPA action level limits without resorting to time-consuming separative chemistry or requiring access to expensive spectrometers.

Table 3 presents the parameters for three TMFD sensor designs (ranging from portable survey meters, to fixed in place sensors to laboratory-grade sensors for bulk assays or for spectroscopy).

TABLE 3

Range of Parameters for Investigations

| Parameter | Parametric Range |
| --- | --- |
| Uranium chain alpha radiation nuclides | Note: these are available certified from NIST in exempt quantities but will still be further diluted to ultra-trace levels. |
| Energy Range | 5.3 MeV to 7.69 MeV |
| Nuclide types | $^{210}$Po, $^{222}$Rn, $^{220}$Rn, $^{214}$Po |
| Airborne States | $^{222}$Rn & $^{220}$Rn in air environment (volumes of 10 gal through typical home basement); in totality of equilibrium of Rn and progeny, and via filtration of progeny via 0.1 mm filters to study gaseous Rn alone. |
| Activity Range | Air: 1 pCi/L through 10 pCi/L; Water: 300 pCi/L to 4,000 pCi/L. |
| Fluids & Deliberate Inclusions (e.g., for soil testing) | Water (representative inorganic); Acetone/heptane/hexane/methanol, ethanol (representative organics); Alumina powder (representing dust/motes/soil to include along with nuclides of interest) |
| Beta-Gamma emitting representative environmental nuclide | $^{210}$Pb, $^{214}$Po, $^{40}$K (a widespread about 1 MeV beta-gamma emitter in environment and in animal bodies) to be included in mixture of Rn chain isotopes. |
| Sampling Protocols | Bubbling through TMFD fluid followed with transfer to TMFD; Self-suction in previously degassed TMFD vials; Automated intake via TMFD suction mode operation followed with top-off. |
| Operation Modes | Portable surveys; Self-actuated operation; Laboratory based assessments of samples from the field. |
| TMFD configurations | Portable (threshold exceeding alarm type); Fixed (continuous intermittent monitoring); Laboratory based (high throughput of field samples sent for testing as in present-day approaches, and for high-fidelity spectroscopic assessments). |
| Overcoming Problem/ False-Positives/ False-Negatives | Precompression of sample-bearing fluid in apparatus (overcome false-positives) Dissolving large motes (leading to self-shielding related false-negatives) in solvent prior to entry within TMFD Filtration (overcome false positives and to study Rn gas vs progeny) |
| Validations and Comparisons for accuracy & reliability | Blind tests by licensed testing centers Comparisons of TMFD predictions vs Lucas Cell, LS6500 spectrometer and ATD systems. |

In operation, to use the device, air from the room can be percolated or bubbled through the acetone or other TMFD sensor fluid within a container using a line tubing (e.g., aluminum or steel) that is compatible with the chosen organic fluid (to avoid being attacked chemically); the radon-bearing liquid which can then be transferred in the TMFD chamber and radon detected thereafter, via application of appropriate level of tension (either centrifugally or acoustically). Alternatively, a fluid sample such as a water sample can be mixed with the chamber fluid to determine if radon is present in the water sample. Water-bearing radon if mixed with TMFD fluids such as acetone tends to separate from the host molecules when a centrifugal force is applied and hence, is not preferred. A more preferable approach involves bubbling air through a radon bearing water sample and directing the bubbled air through a line (preferably metal or another material that is not attacked by the TMFD fluid) into a container bearing the TMFD liquid such as or more preferably.

Enhancements to the efficiency of detection entail modifying the temperature of operation (higher temperatures of acetone would lower Pneg value; alternately, chilling the acetone during uptake e.g., with dry ice or some other cooling mechanism can dramatically enhance the solubility of Rn and require less time for sampling). Alternative liquids to acetone include methanol, ethanol, isopentane, R-113, and the like, and mixtures of these (esp., acetone+isopentane to reduce the Pneg values required for detection), supersaturation with gas, use of a larger TMFD volume to reduce detection time, moving the sample selector around to ensure pickup from various locations.

A laboratory-based unit could entail receiving Rn-bearing samples from a remote site for testing in the CTMFD. A separate system for sampling (as indicated above) would entail a vial with TMFD fluid, and an air bubbling unit as mentioned herein.

A portable unit on the other hand would likely entail a TMFD already filled with the working fluid which holds a sparger that is connected to an air line connected to a pump. Alternately, a collection unit similar to that used for the laboratory-based unit could be used. Once collection is done, a syringe-like system would be used to transfer the Rn-bearing fluid into the TMFD (such as by using a 0.2 micron filter to remove motes).

A system to compress the TMFD fluid before use may be employed as well. This compression could entail insertion of the Rn-bearing sample in a closed container and pressurized to a level of about 10 bar for up to 1 h. Shorter compression time can be used. For field use, if a precompression system is desired, a gas line connected to a pump could be used to pressurize the liquid contents. With a piston like device that separates the gas from the TMFD fluid. This piston in such a configuration would act as a pressure transfer mechanism such that it is sealed (with rubber type gasket) from allowing compressed gas from leaking into the liquid space. This configuration could be employed with the vial with Rn-bearing fluid or with the already-filled TMFD system directly. Both vial and TMFD could be designed so as to be able to withstand 10 bar of internal pressure. Alternately, the vial or TMFD could be placed within a pressure chamber that can provide a restoring force from outside the TMFD chamber to prevent rupture.

In certain embodiments the bubbling unit can be dispensed with completely, for example, if degassed TMFD fluids like acetone are used. For a 20 cc TMFD unit, this could entail a Rn environment of 30 pCi/L and higher which is readily attainable in mines and similar locations. Alternately, a 200 cc TMFD even 3 pCi/L would be readily detected. In such cases, pre-degassed fluids could be prepared (e.g., using acoustic agitation along with vacuum sealing). During operation, off a seal to allow air to enter the TMFD fluid.

EXAMPLE 1

This example demonstrates that alpha-emitting Rn in air can be efficiently collected and introduced into TMFDs. A 4-step procedure depicted in FIG. 4B was used. In step 1 we used a $^{226}$Ra source (about 500 nCi) which decays to generate $^{222}$Rn gas and progeny; an airstream bubbled the material into a 100 mL acetone-filled container to generate about 10 kBq/cc in total for the stock solution as determined using our LS6500™ spectrometer. In step 2 the stock solution was diluted to about 6 Bq/mL such that when 1 mL was injected and evaporated into a 10 gal. (38.5 L) enclosed tank with a fan used for mixing, the average activity in air would amount to about 0.15 Bq/L or 4 pCi/L. In step 3 an air pump with a tube bubbled the Rn-air atmosphere at a rate of about 0.5 L/min into a 100 mL acetone-filled container over 10-minutes. In step 4 about 20 cc of the acetone was transferred into our CTMFD, as shown in FIG. 2b, to assess for activity when the tension negative pressure is set to −9 bar (a value chosen such that all alpha emitters from $^{222}$Rn and its progeny can be detected). Cosmic background effects testing required over 150 seconds to result in a count. The CTMFD (with Rn) provided detection for the presence of Rn activity within about 12 to 15 seconds on average indicating about 0.085 Bq in total activity. Within 5 minutes of repeated testing a statistically significant reading was reliably obtained. These tests were successfully repeated over twelve times.

If all the Rn activity in the 5 L of atmosphere bubbled into acetone were retained in the 100 mL acetone volume, it would have amounted to an uptake of about 0.15 Bq in 20 mL of TMFD volume. Since the CTMFD resulted in about 0.085 Bq (in 20 mL) of activity it may at first appear that the results were off by 50%. However, this is not the case. The $^{222}$Rn decay chain (FIG. 1) in secular equilibrium produces in equal parts of activity: 2 beta-gamma emitters ($^{214}$Bi and $^{214}$Pb) and 2 alpha-emitters ($^{218}$Po, $^{214}$Po). Of the 0.15 Bq activity from all five isotopes, the combined activity from the three alpha emitting isotopes should amount to about 0.09 Bq (=0.15*3/5). The LS6500 scintillation counter counts for both beta-gamma and alpha activity since it is sensitive to all types of ionizing radiation. However, the CTMFD being blind to beta-gamma emitters offers the unique ability to selectively search only for alpha emitters. Hence, the findings show that virtually all of the Rn in air was entrapped in the acetone solvent in about 10 minutes of bubbling at 0.5 L/min and then was rapidly detected.

The solubility of Rn in acetone is very high at about 6 mL/mL, about 20 times greater than for air in acetone. This amount of Rn could not be detected with the LS6500. This example demonstrates that rapid entrapment of Rn in a representative TMFD fluid (acetone) followed by rapid detection of Rn at activity levels not possible with a typical spectrometer.

EXAMPLE 2

This example demonstrates detection of Rn at EPA action limits, a process which today requires off-site monitoring. Similar steps as in Example 1 were followed starting with the formation of a stock solution and then diluting it to about 4,000 pCi/L (of Rn and progeny in water) representing the EPA maximum control limit. By bubbling air from a fish tank pump at about 1.25 L/min. for about 30 minutes and then leading the Rn-bearing air into a container with about 100 mL of hexane (an organic liquid for which the Rn-dissolution level is several times higher than for acetone) maintained at dry ice temperature. The Rn-bearing hexane was transferred into a CTMFD where, unlike for Example 1, the CTMFD central (sensitive) volume was only about 3 mL. Upon inducing centrifugal force and reaching a tension level of about −9 bar (Note: for hexane the level of tension can be about −8 bar to detect all of the Rn and alpha emitter progeny. In this example −9 bar tension was used. Reliable and repeated detection of alpha emissions from Rn and progeny were obtained on average within about 14 seconds each time.

EXAMPLE 3

This example demonstrates Rn detection in water (at EPA maximum allowable levels) using the disclosed TMFD without intermediate separation of Rn and bubbling as in Example 2. In this case, TMFD is filled with a mixture of 50% acetone and 50% isopentane by volume for detection of alpha radiation from Rn and progeny while in water. The Rn bearing water is directly incorporated into the TMFD fluid mixture at concentrations of about 5% followed by testing for Rn.

Radon is a gas. Its key radioactive emissions are alpha particles. Alpha particles are charged He-4 nuclei, which can be stopped with micron type layers of metal or glass or water. Detecting alpha particles of energy in the range of 5.5 MeV (for Radon-222) requires bringing Rn in direct contact with the detector internal fluid. For conventional detectors this means bringing radon directly in contact with scintillator type materials. Conventional detectors suffer from loss of efficiency since only the alpha particles in the direction of the scintillation material can be absorbed and possibly result in a signal. Furthermore, electronic noise and other issues lead to a fundamental limitation for detection efficiencies to range between about $10^{-3}$% for track type to at most between 10-50% for scintillator based systems which are expensive and time consuming to operate.

Therefore, since TMFD systems are detectors which employ glass-metal enclosures where the detector's metastable fluid is located, one must find simple, efficient means to incorporate the Radon-bearing air into the TMFD fluid before detection can be accomplished. TMFDs can then be employed to detect the energetic alpha particles characteristic of Rn-222 and its daughter radionuclides (Po-218 and Po-214) in real-time with near perfect efficiency. This is because the maximum distance the alpha particles can travel in typical TMFD fluids are in the 1-10 micron range whereas, the TMFD metastable fluid volumes are over 1,000 to 10,000+ times larger. Nearly 100% of the alpha particles emitted by Rn-222 or daughters will be captured and, if the TMFD fluid is tensioned to about −9 bar (if the fluid is acetone) each and every alpha particle interaction is converted into a detection event by the formation of a bubble within nano-to-micro seconds accompanied with a "pop" that can be audibly detected. The formation of the bubble can also be electronically recorded via light-beam cutoff or by the naked eye/ear.

Reference Data (Variety of Sources at 20° C.)

Density of radon about 9.4 g/L=0.00943 g/cc→this is ×10 higher than for air.

Solubility of air in water about 0.025 g/L=0.025 mL/mL
Solubility of air in acetone about 0.18 mL/mL
Solubility of radon: 0.22 mL/mL (water); about 6.3 mL/mL (Acetone); about 12.8 mL/mL (benzene); about 20 mL/mL (hexane).

Rn-222 (3.8d): =1.55×10$^5$ Ci/g; =6.5×10$^{-18}$ g/pCi; =6.9×10$^{-16}$ cc/pCi; this means that the partial pressure of Rn in air (in pCi/L levels) is negligibly small.

Main (alpha emitting) Rn-222 daughters and their half-lives are (FIG. 1): Po-218(3.1 min); Po-214(0.16 ms). These could reduce the wait time by a factor of 3 when counted together with Rn-222. Decay schemes from Th-232 may vary but the overall method for using Th-232 or other parent isotopes are essentially the same. Radon or Radium or other alpha emitting nuclide-bearing media such as water can also be tested.

Rn has been shown to migrate and get lodged in acetone in sufficient quantities for testing using the disclosed methods. The table below shows average detection time after incorporating Rn-222 to various activity levels into 20 ml of acetone.

| Wait time(s) | Rn (Bq) | Rn (pCi) |
|---|---|---|
| 10 | 0.1 | 2.7 |
| 60 | 0.0166 | 0.45 |

This table indicates that a quantity of 0.45 pCi in a 20 mL volume could be detected within an average of 60 s (alternately, within 20 s if all daughters are taken into account).

Detection Limits

| Rn in air (pCi/L) | In Water (pCi) | In Acetone (pCi) | Notes |
|---|---|---|---|
| 1 | 6 × 10$^{-4}$ | 6 × 10$^{-3}$ | No detection. Unless temperature of acetone is reduced to below −40 C. |
| 100 | 6 × 10$^{-2}$ | 0.6 | Acetone (Yes); Water (No) |
| 30 | 1.8 × 10$^{-2}$ | 0.18 | Acetone (Yes-with daughters); Water (No) |

The table above demonstrates Rn entrapment from air in various solutions. When the air-borne activity was 30 pCi/L, the amount entrained in 20 mL acetone of the CTMFD was 0.18 pCi. With daughter products included, the net activity was 3×0.18 (about 0.6 pCi or about 0.02 Bq) which would require a detection time of about 50 s (=1/0.02). Thus the air-borne Rn activity must be at least 30 pCi/L, with 20 cc of CTMFD volume with a wait time of 60 s to confidently monitor for Rn presence (including progeny). For detecting Rn in air at 3 pCi/L his would require a 10-fold increase in CTMFD volume to about 200 cc or use of another TMFD fluid which can absorb a higher quantity of Rn. Alternatively, the temperature of the TMFD fluid can be reduced since dissolution gas concentrations increase with decreasing temperature (and with the vapor pressure) in a proportionate manner according to Henry's law. Using Henry's law and knowing that the dissolution constant can vary (per Huffington's equation) with temperature in an exponential fashion the degree of Radon solubility in acetone can be determined by noting variations of vapor pressure as shown in the table below. For example, the vapor pressure of acetone at 20 C is about 180 mm Hg and only about 0.16 mm Hg at −78 C. This reduction of about about 1,000 times may be utilized to advantage. For example, a 20 cc vial of degassed acetone enclosed in dry ice (−78 C) the concentration can be used and radon detection sensitivity can be increased by over 1,000 times. If the dry ice can be removed rapidly from the TMFD so as not to lose dissolved gas significantly one can detect Radon in air at levels considerably lower than 1 pCi/L.

| Temperature (C.) | Vapor pressure of acetone (mmHg) | Ratio of vapor pressure at 20 C. to vapor pressure at temperature |
|---|---|---|
| 20 | 184 | 1 |
| 50 | 609 | 0.3 |
| 0 | 69 | 2.7 |
| −20 | 21.8 | 8.4 |
| −40 | 5.5 | 33 |
| −78 | 0.16 | 1,150 |

Since the partial pressure of Radon in air is negligible, if degassed volumes are not possible to utilize in situ, Rn-222 (and daughters) can be concentrated in the TMFD fluid.

126 cc of Rn can be dissolved in 20 mL of Acetone, to get 1 pCi of activity requires only about 6.9×10$^{-16}$ cc. Such small amounts can be readily absorbed in acetone in a single pass.

If the acetone is not degassed, merely bubbling Rn-bearing air will selectively substantially absorb only Rn but not air unless the acetone is pressurized.

The time required will obviously depend on the volumetric flow rate and efficiency of uptake. If it is 1 mL/s, the time with 3 pCi/L would be about 330 s (5 min.) at 100% efficiency for uptake. Fish tank variety pumps provide about 20 mL/s (70 L/h), suitable for 15 gallon fish tanks can be used. The required bubbling time could be as low as half a minute.

Am-241 with a 5.5 MeV alpha emission can be used to calibrate the TMFD and to determine the threshold Pneg for detection with as the alpha energy emission of Rn-222 is similar to that of the alpha from Am-241.

The determination of Rn uptake during bubbling based sampling would be facilitated via direct linkage with time-to-detect in the CTMFD assuming knowledge of the starting air activity, which may be obtained using NIST calibrated samples in a large-enough volume of air or water. Beckman LS spectrometry can be used to act as a crosscheck. Alternately, a Lucas-type cell using solid scintillator detectors. Regardless, a NIST-certified Rn source delivering Rn into a closed air-filled tank for a set period of time and with a mixing fan to ensure proper circulation could act as a baseline environment with known activity to drive Rn-uptake into acetone efficiency values vs. rate/type of bubbling flow rates. This is so, because the Rn-bearing sample can then be counted for direct alpha-recoil activity using our CTMFD system. The Beckman and/or Lucas cell monitors could act as crosschecks and possibly for relation to the CTMFD activity during the development period.

Rn-222 chain involves: Pb-214 and Bi-214 (both strong beta and gamma emitters) will give rise to scintillation-caused counts in conventional counters from alpha decay but also to a lesser extent from beta-gamma decay in both the Beckman LS spectrometer as well as in another scintillation counter. Specifically, Bi-214 gives off a 3.26 MeV (max)

beta (99%) along with a range of gamma-ray emissions ranging from 0.6 MeV to 2.2 MeV. Similarly Pb-214 releases 0.67 MeV (max) beta and a range of gamma rays from 0.2 MeV to 0.35 MeV.

Therefore, these counting systems should be utilized with caution for overall guidance but not for precise selective quantitative alpha activity as offered by the TMFD technology which remains blind to gamma-beta radiation when operated in STP environments under tension pressure levels of fluids such as acetone above and around −20 bar.

The principle alpha emitters in the Ra-226 chain are Rn-222, Po-214, Po-218, and Po-210, respectively. The alpha energies for each and their half-lives are known. There is a vast variation of half-lives and also the alpha energies involved. This is advantageous in that during Ra-226 decay, a secular equilibrium will soon transpire between Rn-222, Po-214 and Po-218 (but not Po-210 which has a 138 day half-life). What this means is that Rn-222 counting efficiency (in terms of time required for detection) can be virtually tripled since Rn-222 will be present in equal quantity of activity with Po-214 and Po-218 if the tension pressure (Pneg) is established so that the least energetic alpha emitter (in this case Rn-222 with about 5.5 MeV) can be detected. With NIST-certified Am-241 which also has an alpha emission of about 5.5 MeV the Pneg (in a CTMFD with acetone as the detection fluid) needs to be below about −9 bar for conclusive detection of Rn-222 and therefore, also for Po-214 and Po-218 which emit higher energy level alphas. If time for detection can be relaxed somewhat, a higher value of about −4 bar could be utilized in the CTMFD (using acetone) to selectively and conclusively monitor for the about 7.8 MeV alpha particle emissions of Po-214. Indeed, this may be advantageous to allow use of smaller rotational speeds for driving the CTMFDs of a given size, and furthermore, permits one to also conduct spectroscopy as a side benefit for scientific studies.

Validation of TMFDs for Rn-222 (Including Daughters) Detection

Scoping tests were conducted to assess for the feasibility for detecting Rn-222 (emitted from Ra-22 as the feed stock). NIST-certified Am-241 was dissolved into acetone and tested for the level of Pneg required for conclusive detection of the 5.5 MeV alpha emitted from Am-241. Since Rn-222 also emits 5.5 MeV alpha particles the required Pneg value was established for conclusive detection. The required Pneg is found to be at or around −8 bar to −9 bar.

Thereafter, a Radiological and Environmental Management System (REMS) based Ra-226 standard was used to produce Rn-222 and daughters and transported via air-flow into an acetone-filled canister. This Rn-enriched acetone stock solution was then counted for times ranging from 10 minutes to over 1 h in the laboratory's state-of-art Beckman LS6500 spectrometer to assess for the level of radioactivity in the acetone. This was >>>1,000 pCi/cc of acetone. However, the Beckman LS6500 system allowed quantifying the order of magnitude of Rn-222 (and daughters) in the acetone. A direct dilution of the stock solution to about 1 pCi (Rn-222) activity in 20 cc of acetone was tested. The results indicated good comparison with the Beckman LS6500 system.

Figure 6:
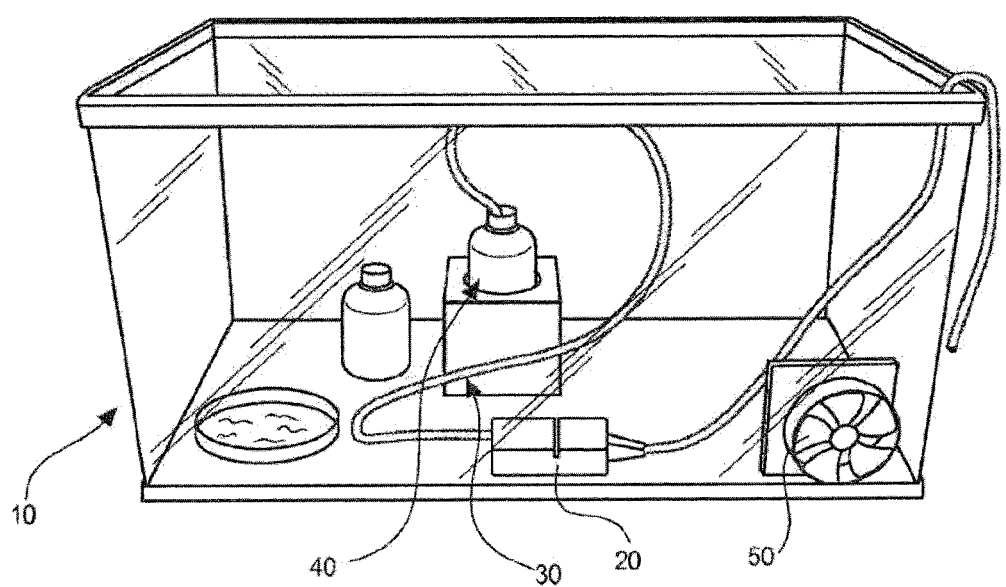
FIG. 6 provides an illustration of an apparatus for gathering an air sample.
Figure 7:
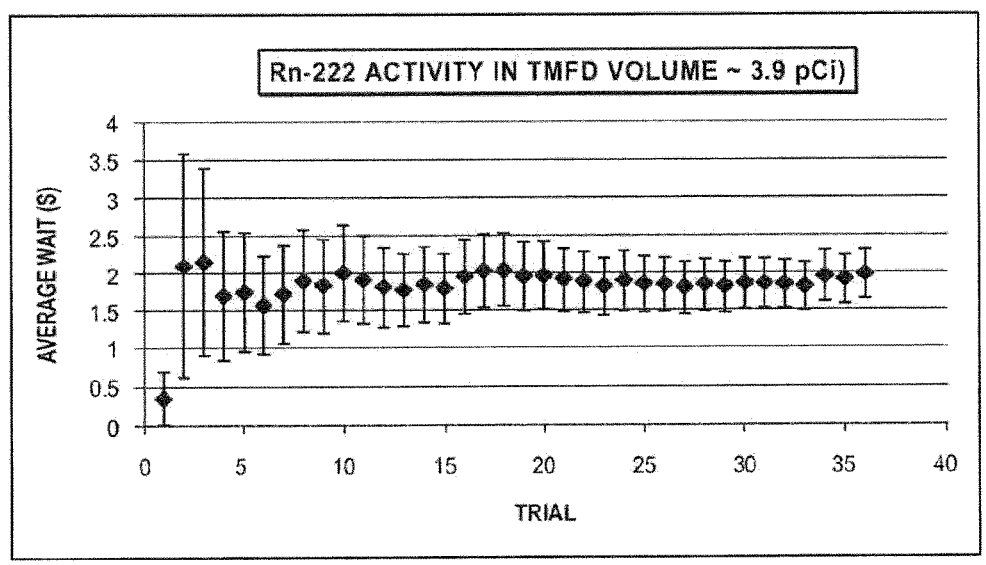
FIG. 7 provides typical results for time to detect for Radon (and daughters) radioactivity using CTMFD (Pneg is −9 bar; error bars are 1 standard deviation; TMFD acetone volume is about 20 cc at 20° C.).

A fish tank 10 was configured (FIG. 6) with an air-bubbler pump 20 and line 30 dipped into a 100 cc type container 40 bearing acetone. A computer fan was placed therein to create a uniformly mixed environment. A drop of (diluted) acetone containing Radon from the stock solution was next dropped using a syringe into the enclosure. The drop was allowed to evaporate after which the pump started and Rn-bearing air was allowed to bubble through the acetone filled bottle. This solution was then mixed into the CTMFD fluid and tested. Results for time for detection for multiple trials with the CTMFD (with a volume of about 20 cc and at tension pressure of around−9 bar) is shown in FIG. 7. As noted, the running average waiting time before a detection event takes place is 2 seconds, indicating a total alpha activity of about 9 pCi from which the Rn-222 alpha activity would be about 2 pCi (similar to and lower than the 4 pCi/L EPA limit). A running average can be used to arrive at a confident plateau (with small enough uncertainty) so as to offer conclusive proof and avoid false positives—yet, within a total time frame of only a few minutes (compared with tens of hours to weeks with present-day systems). With ordinary acetone alone, it was verified that the average wait time was over 100 seconds (note: detection events do take place even without deliberate Radon injection from background radiation; however, for wait times significantly below 100 seconds background effects may be considered as negligible for this configuration).

This experiment demonstrates that with a common TMFD fluid such as acetone, radon in air at levels of EPA concern may readily be entered into the detection fluid, and detection times for such quantities of Rn-222 as about 3 pCi per 20 cc of TMFD fluid will lead to ready detection within about 2 seconds on average, for the presence of Radon and it's key daughter nuclides. This experiment also demonstrates that if the dissolved Rn-222 activity in 20 cc of acetone were about 1 pCi instead of 3 pCi, the time to detect would be 3 times higher at about 6 seconds.

Figure 8:
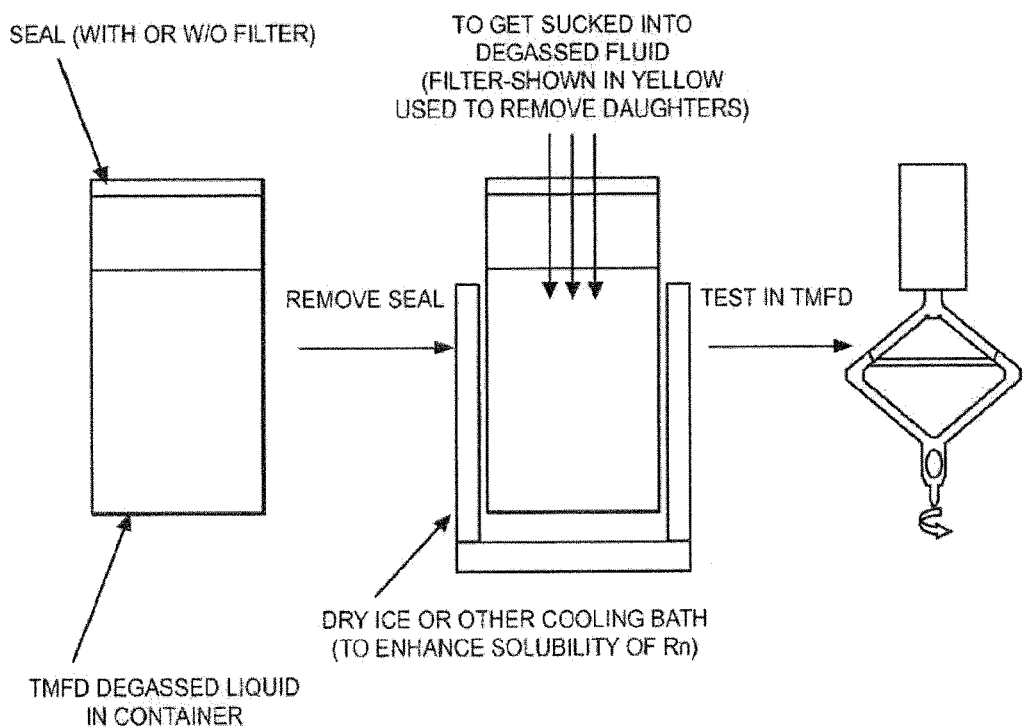
FIG. 8 provides a schematic of apparatus configuration for TMFD based passive radon (with/with daughter contributions) collection.

FIG. 8 depicts a system where the TMFD fluid 110 is first degassed. The mouth of the container may or may not include a filter to remove Po-218 and Po-214 particulates. When ready for field use, the user would merely peel off the seal 120 to permit the Radon-bearing air to dissolve into the body of the acetone. Thereafter, the Radon-bearing acetone would be tensioned to at or below −8 bar to −9 bar and the wait time would be noted to then directly relate that to the activity in the TMFD fluid. For example, if as in FIG. 8 the average wait time is 2 seconds and the Rn daughter products were not pre-filtered, then the activity would be about 1 pCi. If need be, the vial of acetone may be enclosed in dry ice or other refrigerant to allow greater ingress/solubility of Rn.

Figure 9:
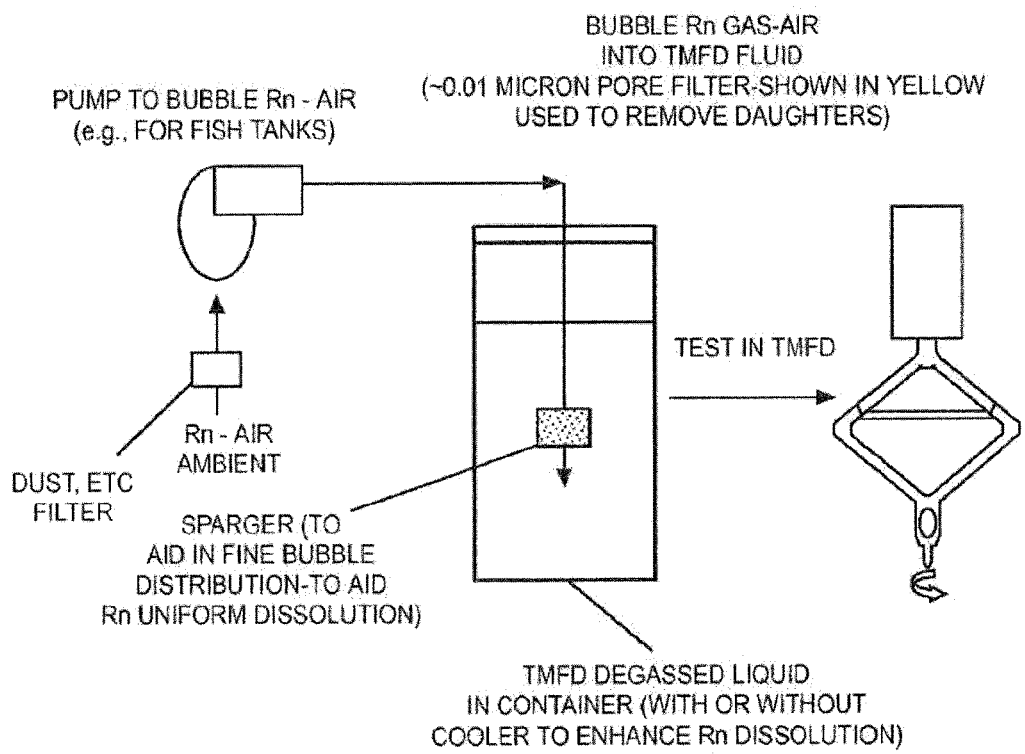
FIG. 9 provides a schematic of apparatus configurations for TMFD based active radon (with/without daughter contributions) collection.

In similar fashion, Rn-bearing air could be bubbled into the TMFD fluid as shown in FIG. 9. FIG. 9 shows a sparger 210 at or around the tip of the line dipped into acetone to allow greater spread of bubbles (and therefore, greater contact of the Rn-filled air within the molecules of acetone). The time for bubbling would be related to calibration charts relating bubbling air flow rates with the TMFD fluid and the Radon concentration in the ambient. Also shown are filters for common dust, etc. particulates and possibly, for Radon daughter products. Once again, the acetone could be chilled using dry ice or other refrigerant to permit greater solubility of radon.

Assuming a uniformly available source of Rn-bearing air, acetone as the TMFD fluid, a 20 cc pre-filtered (through 0.2 micron filter) acetone volume, a 3 pCi/L environment, and requirement to alarm within 5 min. of testing start we would need an air-bubbler with a flow rate of about 60 cc/min. The air line would preferentially be made of plastic or material that is not attacked by acetone. A dust filter would be helpful to prevent ingress of dust particles about 0.2 microns. The end of the line dipped into the bottom of the container holding acetone would include a sparger to break up the air into fine bubbles to enhance surface area and ability for Rn(+daughters) to enter the liquid.

The degree of uptake would follow a chart prepared via experimentation to judge the efficiency of Radon uptake into acetone (or other CTMFD fluid). Thereafter, the degree and time required would be set and associated with deciphering what threshold level (e.g., more time for <3 pCi/L alarm setoff) is desired.

To avoid degassing related time wastage, the assemblage would be compressed to about 10 bar (for about 30 min.) to avoid false detection events.

The CTMFD would then be set to assess for the average wait time to assess for precise quantity of activity; alternately, to stop beyond about 60 s and repeat a few times for statistical significance. If no activity is detected, the system would indicate radon levels below 3 pCi/L. If not, an alarm sounds.

An alternate means to reducing the wait time during the CTMFD operation would entail increase of time for bubbling of Radon bearing air in the first place to enhance the uptake during sampling. For example, if 5 min. was the time span commensurate with uptake of 0.5 pCi requiring 60 s CTMFD time for detection, the sampling uptake via bubbling may be increased to 10 min. to then reduce CTMFD time for detection to 30 s.

Figure 10:
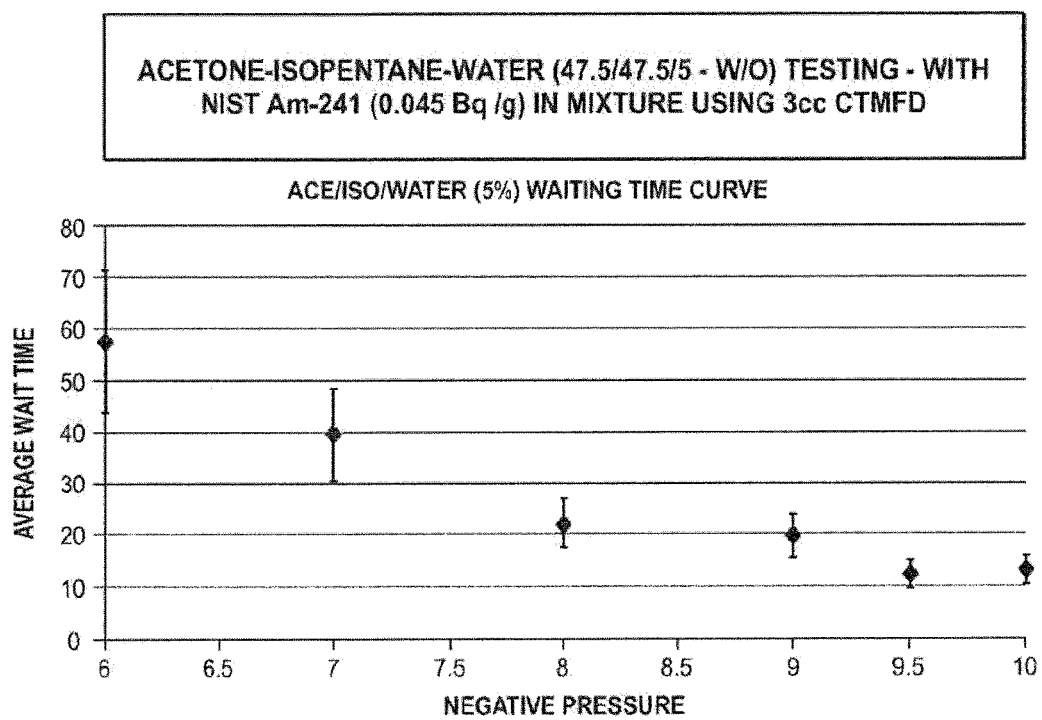
FIG. 10 provides methodology and results indicating how one can use Am-241 tracer with an alpha energy of similar level to that of Rn-222 to calibrate TMFDs for ascertaining the needed tension pressure levels for conclusive detection when Rn-bearing water is added to baseline TMFD fluids.

FIG. 10 provides a representation of detection efficiency for radon in water by addition of the radon-type alpha emitter (Am-241) in water into a 50/50 mixture of acetone and isopentane. The Am-241 concentration in the mixture is ~0.045 Bq/g. The addition of water into either acetone or water at concentration levels higher than about 5% by volume requires much higher tension threshold for detection (i.e., significantly below −10 bar). In order to improve the threshold tension (i.e., make it more positive than negative) required for detection by acetone it is useful to include isopentane. It has been found that, to remain at and above −10 bar for detection, a 50/50 mixture of acetone and isopentane, with r water can provides detection of radon and its progeny daughter products. As can be seen in FIG. 10, the wait time curve begins to level off after about 9 bar negative pressure when a NIST-certified stimulant radionuclide (Am-241) with the alpha energy similar to that for Rn is utilized at a concentration of about 0.2 Bq/cc in a 3 cc CTMFD.

Figure 5A:
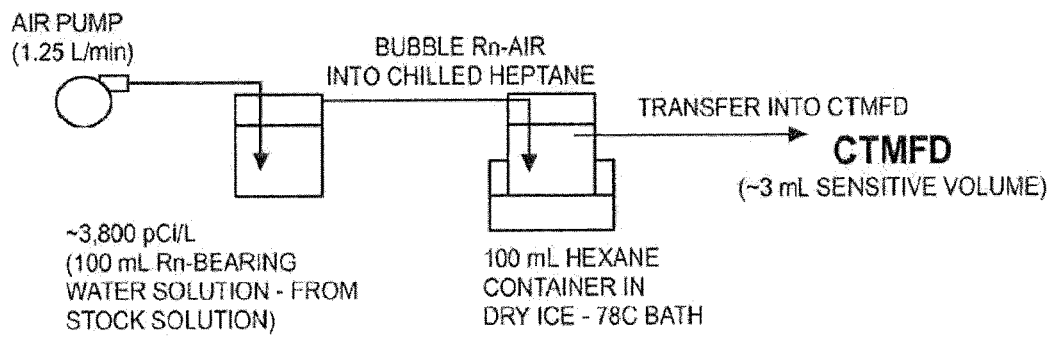
FIG. 5A illustrates a multi-step process for demonstrating the detection of radon and progeny from a controlled Rn-bearing water sample (at about 4,000 pCi/L); in this case air is pumped using a pump at the rate of about 1.25 L/min. for 30 minutes into a 100 mL volume of hexane (which was chilled to dry ice temperatures) followed with transfer of the Rn-bearing hexane into a CTMFD apparatus with about 3 mL sensitive detection volume.
Figure 5B:
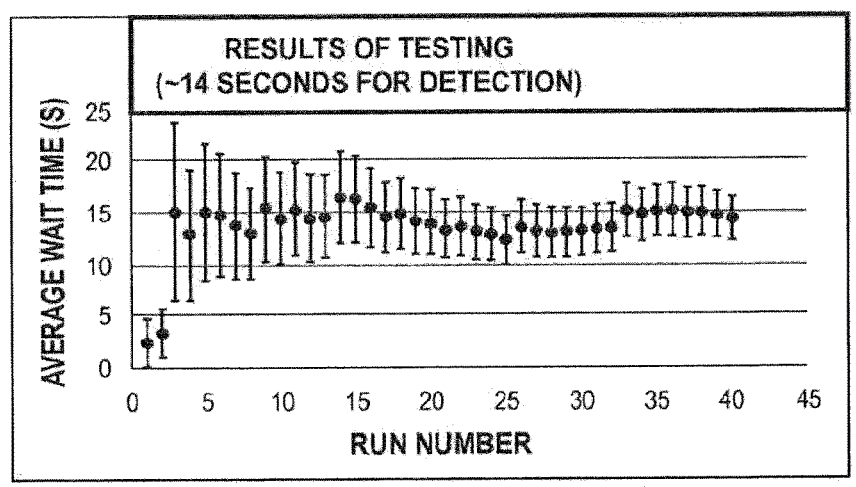
FIG. 5B demonstrates detection times after imposition of centrifugal force to induce tension metastability level of about −9 bar, resulting in repeated rapid detection within about 14 seconds. In case the Rn activity level in water were at or below 300 pCi/L, this would entail a time to detect which is about 10 times greater if the same designed CTMFD were used (i.e., with a 3 mL sensitive volume). To circumvent 10-fold longer times for detection one would simply utilize a CTMFD such as in FIG. 4B where the central volume was about 30 mL, thus, once again permitting detection on average within about 14 seconds. Such detection capability at 4,000 pCi/L or 300 pCi/L were not possible using a LS6500™ Beckman spectrometer.

Compared with the approach of FIG. 5A, a more direct way to monitor for radon in water is to directly transfer the radon-bearing water into a 50/50 acetone-isopentane mixture with a 20:1 ratio (i.e., 5 v/o of water into acetone-isopentane mixture) which is then entered into the CTMFD for testing. A control sample of radon in water was created by pumping air over a Radium source through 100 mL of water to create a stock solution. The resultant activity was confirmed for approximate activity using a Beckman LS6500 spectrometer for total activity after which the water was diluted to result in a batch containing about 4.00 pCi/L of radon activity. Using a CTMFD with a sensitive central bulb volume of about 23 cc, a mixture of 5 v/o radon bearing water with balance 95 v/o (50/50 acetone-isopentane) was created to have a radon and progeny concentration of ~400 pCi/L and introduced into the ~23 cc CTMFD. This system was then tested for activity resulting in detection on average within about 50 seconds as shown in FIG. 11 which is close to the expected value.

Alternate means may be utilized for devising a CTMFD type system (FIG. 2B) usage protocol, which can self-suction external radon-bearing air. This is depicted in FIG. 12. In this case embodiment the liquid in the upper arms across the bend can be removed so that the system will act as a suction pump to entrain outside air which migrates to the central bulb via passage through the TMFD fluid. Upon stopping of rotation that air gets out of the system back into the environment. Upon repeated suctioning of outside air, to within the liquid of the CTMFD, radon becomes entrained at similar rates as with air bubbling. After the desired number of such cycles, the liquid in the upper arms is refilled and the system can be used to detect radon using the disclosed methods.

FIG. 12 shows a modified CTMFD configuration which includes a stem with a valve positioned in the lower arm of the diamond shaped arms underneath and towards the right of the meniscus of the liquid in the upper arm. In the region of liquid to the left of the meniscus, the centrifugal forces balance the pressures to introduce a net equilibrium in the lower and upper arms. However, in the region of liquid space to the right of the stem the negative pressure increases from 0 down to Pneg at the centerline of the CTMFD. By opening the valve of the stem permits air from the outside to become entrained inwards towards the central bulb upon rotation of the CTMFD. Very modest suction pressures will overcome the gravity head of fluid above the suction pressure and can be determined from the Pneg formula for a given distance "r" from the meniscus towards the centerline for a given density and rotational frequency. The gravity head to overcome can be estimated as equal to $\rho g h$ (where, $\rho$ is the fluid density, g is gravitational constant, and h is the height of the fluid in the stem in the lower arm). Upon stopping of the CMTFD rotation, the ingressed air can bubble out through the arms to the outside air. Repeated such suction can then permit entrainment of radon from the outside air without needing to remove and re-enter CTMFD liquid. After a set number of cycles the valve can be closed (e.g., twisted shut) such that no outside air can enter and the system can be tensioned to desired levels for testing for radon alpha radiation activity.

A CTMFD system which contains radon for testing may be reused without replenishment if allowed to decay to approximately the level of the general outside air radon concentration of about 1.5 pCi/L to 2 pCi/L. Since 4 pCi/L is the EPA action threshold for homes and businesses, this would require about 2 to 4 half-lives to pass from the longest half-life isotope in the Rn-222 decay chain (through Po-214); which is that for Rn-222 itself which is 3.8d as seen from FIG. 1. After 2 to 4 half-lives the residual activity would have decayed down significantly to below outside air background levels. Therefore, the same fluid may be reused with reasonable confidence and absence of background buildup after a period of 7 to 14 days. Such a system could conceivably be utilized in homes on demand (via simple opening-closing of a twist valve) with self-suctioning.

If it is necessary to determine only radon levels versus that of the gas and progeny, the mixture (of radon and progeny) may be separated using a filter in which solid progeny particulates are withheld. Suitable filters include coffee filters and 0.01 micron and below PTFE filters which can be charged with an electrostatic charge field to attract the positively charged radon progeny particulates. The filter may be used with fluids like water which have a relatively low affinity for radon gas but not in organics like acetone and hexane where the radon affinity is much higher.

Those skilled in the art will recognize that numerous modifications can be made to the specific implementations described above.

The invention claimed is:
1. A method for detecting radon comprising:
  obtaining a radon detecting device having a chamber holding a fluid;

placing a radon contaminated material in contact with the fluid by bubbling radon contaminated air thru a second fluid and mixing the second fluid with the chamber fluid, or thru the chamber fluid;

placing the fluid in a tensioned metastable state using an acoustic sound at alpha particle detection tension so that cavitation events occur in the fluid when alpha particles are present, and detecting radon.

2. The method for detecting radon of claim 1 wherein the chamber fluid is degassed.

3. The method for detecting radon of claim 1 further comprising placing the detecting device in a space in which radon detection is needed.

4. The method for detecting radon of claim 1 further comprising placing the detecting device in a laboratory space and detecting radon.

5. The method for detecting radon of claim 1 further comprising placing the detecting device in a dwelling in which radon detection is needed.

6. A radon detecting device comprising a chamber holding a fluid in a tensioned metastable state, wherein the chamber contains a fluid at between about 4 to about 9 barr of pressure at an alpha particle detection tension so that cavitation events occur in the fluid when alpha particles are present, and having a radon contaminated material in contact with the chamber fluid.

7. The detecting device of claim 6 wherein the device can measure radon at concentrations in the range of at least about 0.1 pCi/L in air and at and about 300 pCi/L in water.

8. The detecting device of claim 6 wherein the chamber fluid includes acetone and isopentane.

9. The detecting device of claim 6 wherein the chamber fluid includes acetone, isopentane and water.

10. A method for detecting radon comprising:
obtaining a radon detecting device having a chamber holding a fluid;
filtering a radon contaminated material;
placing the radon contaminated material in contact with the fluid;
placing the fluid in a tensioned metastable state using centrifugal motion at alpha particle detection tension so that cavitation events occur in the fluid when alpha particles are present; and detecting radon.

11. The method for detecting radon of claim 10 further comprising placing a radon contaminated material in contact with the chamber fluid by allowing radon contaminated air to diffuse into the chamber fluid.

12. The method for detecting radon of claim 10 further comprising filtering radon contaminated fluids prior to adding them to the chamber fluid and removing radon progeny.

13. The method for detecting radon of claim 10 further comprising precompressing the chamber fluid.

14. The method for detecting radon of claim 10 further comprising cooling the chamber fluid and bubbling ambient air through the chamber fluid to collect radon.

15. The method for detecting radon of claim 10 further comprising cooling the chamber fluid and sparging ambient air through the chamber fluid to collect radon.

* * * * *